Nov. 4, 1947.  V. RAKOWSKY  2,430,186
ARTIFICIAL MAGNETITE IN HEAVY-MEDIA SEPARATION
Filed July 12, 1944
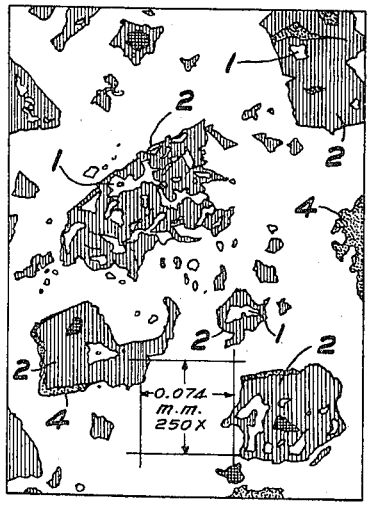
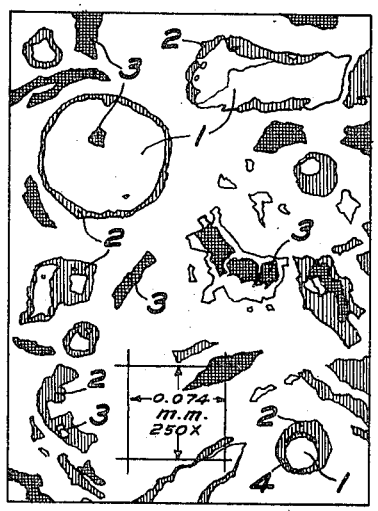
steel   magnetite   gangue   hematite
Fig. 1.                                   Fig. 2.
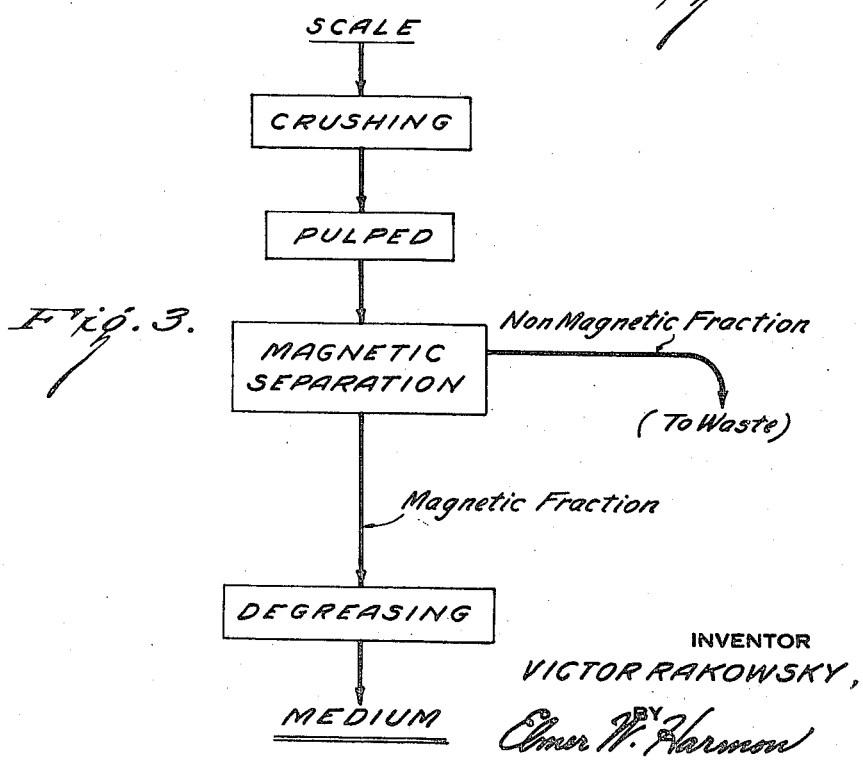
Fig. 3.
INVENTOR
VICTOR RAKOWSKY,
BY
Elmer W. Harmon
ATTORNEY Patented Nov. 4, 1947

2,430,186

UNITED STATES PATENT OFFICE 2,430,186

ARTIFICIAL MAGNETITE IN HEAVY-MEDIA SEPARATION

Victor Rakowsky, Joplin, Mo., assignor to Minerals Beneficiation, Incorporated, Joplin, Mo., a corporation of Delaware Application July 12, 1944, Serial No. 544,570

1 Claim. (Cl. 252—60)

This invention relates to the separation of heterogeneous mixtures of solid particles by the use of heavy media. More particularly, the invention relates to novel and improved media solids of high density adapted to use in preparing separatory fluids and to a method of preparing such media solids.

Considerable interest has been shown in recent years in the so-called "sink-and-float" separation of mixtures of solid particles. This field includes a number of processes for the separation of mixtures of materials by taking advantage of the different settling rates of particles having different specific gravities in a fluid of the proper density. In its simplest form, a mixture of two kinds of solid particles of different specific gravities is immersed in a fluid having a density greater than one solid and less than the other. The mixture is thereby separated into its component parts by the tendency of the heavy materials to sink and the lighter materials to float.

Various modifications have been proposed to adapt this separation for use in continuously-operating processes. Industrially, the continuously-operating modifications of the process have been particularly attractive to the mining industry for use in the beneficiation of low grade ores. These processes are particularly well adapted to large-scale operation. At the same time, they operate on a relatively low total cost per unit of product. Consequently, the use of these "heavy-media" processes in this field has become commercially very important.

In the application of these processes, various liquids of high density may be employed. However, those most commonly used comprise suspensions of suitably-sized solids in water or other liquids. These solids are designated herein as "media" or "media solids" to distinguish over the solid particles to be separated. The suspensions of media are referred to as the "medium" or "fluid medium." A part of the media is usually colloidal or semi-colloidal in size. Particles in this size range form a substantially permanent suspension which settles by consolidation rather than by stratification. By properly selecting the media solids, a fluid medium, the density and viscosity of which may be widely varied, can be prepared. Using a properly prepared fluid medium it is perfectly feasible to separate solids which differ in specific gravity by as little as 0.01–0.05 of a point.

However, one of the principal technical problems in setting up a continuously operating sink-and-float process is in this selection of the proper media solids to be used in making up the fluid medium. First of all, a heavy-media separation is essentially a low-cost operation, yet even a relatively small operation may require as much as 50–100 tons of media solids in circulation. The media, therefore, must not be of such nature as to increase unduly the expense of operation. It must be available in quantity and either be of very little unit value or be capable of being recovered and reused.

Whatever media solids are used, they necessarily have some basic value. To this must be added the cost of preparing these media solids for use. Recovery and reuse, therefore, is ordinarily the most desirable procedure. While many recovery systems have been proposed, the most practical for many purposes is that in which the solids used are magnetically susceptible and are recovered and cleaned by using magnetic separators. Consequently, the preferred media solids must not only be readily available and inexpensive, but must also be magnetically susceptible.

This introduces still another requirement. Most magnetically-susceptible materials available for the purpose are either ferrous metals or alloys. A majority of them are readily susceptible to oxidation. Unfortunately, this usually destroys their utility since under operating conditions the ferrous metal particles normally oxidize to various iron oxide forms which not only are non-magnetic but in addition have only about half the specific gravity of the original metallic particles. Otherwise, crushed steel, with a specific gravity of about 7.8, or crushed iron, with a specific gravity of about 7.3, would make ideal media solids.

As an alternative, non-corroding ferrous alloys have found considerable acceptance. Ferrosilicon, for example, probably makes the best single material. It has many advantages. It is magnetically susceptible, does not corrode under operating conditions and has a high specific gravity of about 6.9. Unfortunately, it is relatively expensive. Since there are of necessity certain small losses in operation, there is always an additional small but appreciable cost chargeable thereto. However, its use is warranted in many cases and very effective operations have been carried out using ferrosilicon media solids.

However, the specific gravities of the materials to be separated are often low enough so that a medium having a density as high as that of ferrosilicon, with its high initial cost, is not required. Magnetite, a magnetic iron oxide having a specific gravity of about 5.0, for example, can be used to prepare a fluid medium sufficiently dense to be practically useful for many such purposes. There is however, a limitation on the specific gravity of a fluid medium which may be prepared from solid particles of any given density. A fluid medium of substantially any density can be made, but if the solids content becomes too high the fluid becomes too viscous to permit settling of the smaller but heavier particles which comprises the "sink" fraction of the materials to be separated. Magnetite suspensions under ordinary conditions are only useful in separating solids having gravities up to about 2.5.

Unfortunately, there is a large field of use in which separatory liquids, of useful fluidity, prepared from magnetite particles are not sufficiently dense to accomplish a satisfactory separation. Yet many such operations do not otherwise require the use of a heavy ferrous alloy such as ferrosilicon or warrant the expense of using such media. In the past, no suitable media has been available which is relatively cheap, magnetically-susceptible and not subject to appreciable oxidation under operating conditions while at the same time being more dense than magnetite but less expensive than the oxidation-resistant magnetic ferrous alloys. It is the principal object of the present invention to provide suitable media for such use where natural magnetite is too light, but media solids as heavy as ferro-silicon are neither required nor the expense of their use warranted.

In general, the objects of the present invention are fulfilled by the use of a mixture of heterogeneous particles comprising small pieces of iron or steel embedded in matrices of artificial magnetite. Quite surprisingly, under such conditions iron and steel particles are not subject to the serious difficulty with oxidation encountered when they are used alone, namely, the tendency to oxidize to a non-magnetic iron oxide form having a gravity of about 3.5–3.9 as compared with 7.3–7.8. The exact reason for this substantial freedom from corrosion is not fully understood nor is the present invention intended to be limited by any explanatory theory thereof. These media solids of the present invention have the additional advantages of being readily available in quantity and less expensive than natural magnetite.

The media of the present invention are most readily derived from by-products of steel-processing industries which contain considerable amounts of magnetic iron oxides having an analysis similar to that of magnetite. These oxides are therefore referred to in the instant specification as "artificial magnetite." However, they can be purposely prepared, if so desired, by inducing conditions which convert a major portion of the ferrous material to a magnetic oxide form. According to the present invention, it has been found that roll scale, hammer scale and many grinding dusts contain considerable quantities of material meeting the requirements of the improved medium. This is illustrated, for example, in the accompanying drawings in which:

Figure 1 is a reproduction of a greatly magnified sample of roll scale;

Figure 2 is a similar reproduction of a sample of grinding dust; and

Figure 3 is a sample flow sheet diagrammatically illustrating a method for the isolation of the desired materials.

As shown in the drawings, Figure 1 is a representation of a sample of roll scale enlarged to 250 diameters. A 200 mesh (0.074 mm.) opening is given for comparison. Particles of steel 1, represented by the unshaded area, are seen to be variously embedded in a matrix of magnetite 2, represented by light vertical shading. Occasional particles of gangue 3, represented by cross-hatched sections, and some hematite 4, represented by the stippled area, are also seen. A typical assay of such roll scale shows iron, 74–75%; insol, 0.4% and a specific gravity of 5.3–5.6. In some cases, both the iron content and the gravity may be higher. By way of comparison, magnetite assays 72.4% iron and has a specific gravity of 4.9–5.2.

In Figure 2 a different type of material is shown, the sample being taken from a grinding-dust collector. It will be seen that the particles vary somewhat in their general nature from those found in roll or hammer scale. The latter tend to be oblong plates, whereas the particles of grinding dust assume a more rounded appearance. For example, in Figure 2 several large pieces of steel 1 are seen to be enclosed by a thin ring of magnetite 2. It will also be noted that considerably larger amounts of gangue 3 are noticeable, both as free particles and in some cases actually embedded in particles of steel or magnetite. Some small particles of hematite are also to be seen in these samples. While the roll scale samples, before being treated to recover particles suitable for use as medium therefrom, are somewhat heavier than the grinding dust samples, separatory media interchangeable in use are readily recovered from both.

Recovery of the portions which comprise largely artificial magnetite having steel enclosures may be carried out according to the flow scheme of Figure 3. The scale or dust is first crushed in order to bring it to an appropriate size. Crushing is normally to about minus 65 mesh. However, some operations require somewhat larger media solids. In such a case, crushing is carried out only to about minus 25–30 mesh. The second problem is to remove the non-magnetic materials and the gangue or acid-insoluble content therefrom. This is best done by making a pulp of the crushed materials in water and subjecting the pulp to a magnetic separation, whereby the magnetically-susceptible particles are removed therefrom.

Finally, the magnetically separated particles must be treated to remove the residual grease and other waste mixed therewith. This is usually a much more difficult problem in the case of the grinding dust than in the case of the roll scale or hammer scale. The latter are therefore ordinarily preferable. It was found that the grease, oils and the like were readily removed by solvent extraction using solvents such as acetone, alcohols and the like which can be recovered and reused if so desired. Where a solvent extraction is undesirable, an aqueous washing using such grease-cutting agents as trisodium phosphate and the like may be substituted.

The artificial magnetite media solids of the present invention, having gravities of from 5.2–5.7, are useful in making effective separations of solids having gravities up to about 2.80. This considerably increases the range obtainable with natural magnetite, which for ordinary sink and float operations, has a top value of about 2.50. Using slightly larger particles of media solids to reduce the viscosity, and an upward rising current, the artificial magnetite medium of the present invention may be used to effect separations up to the lower limits of the range in which a material having densities such as that of ferrosilicon are used. It is also readily possible to blend the medium of the present invention with a small amount of ferrosilicon if so desired. This extends the normally useful range over which either may be used alone.

I claim:

A heavy-media separatory fluid adapted for the separation of solid particles from a mixture thereof of different specific gravities including particles having a specific gravity from about 2.50 to about 2.80, which comprises essentially a suspension in water of a sufficient amount of a heterogeneous mixture of magnetically-susceptible, finely divided, degreased solid particles to produce an average fluid density of from about 2.50 to about 2.80, said particles mixture having an average specific gravity of from about 5.2 to about 5.7, said particles comprising essentially small amounts of ferrous metals imbedded in and substantially surrounded by artificial magnetite, the particles mixture having an average iron content of from about 73–76% and being resistant to oxidation in said suspension.

VICTOR RAKOWSKY.

REFERENCES CITED

The following references are of record in the file of this patent:

UNITED STATES PATENTS

| Number | Name | Date |
|---|---|---|
| 1,448,515 | Borcherdt | Mar. 13, 1923 |
| 1,580,723 | Hapgood | Apr. 13, 1926 |
| 1,585,756 | Borcherdt | May 25, 1926 |
| 1,663,492 | Chamberlain | Mar. 20, 1928 |
| 1,743,466 | Maag | Jan. 14, 1930 |
| 1,937,039 | Johnston | Nov. 28, 1933 |
| 2,075,466 | Queneau | Mar. 30, 1937 |
| 2,315,650 | Pearson | Apr. 6, 1943 |
| 2,336,470 | Davis | Dec. 14, 1943 |